US009867049B2

(12) United States Patent
Aoyagi et al.

(10) Patent No.: US 9,867,049 B2
(45) Date of Patent: Jan. 9, 2018

(54) MOBILE STATION PERFORMING ACCESS CONTROL WITH NAS RESTRICTION INFORMATION SENT FROM RADIO BASE STATION

(71) Applicant: NTT DOCOMO, INC., Tokyo (JP)

(72) Inventors: Kenichiro Aoyagi, Tokyo (JP); Wuri Andarmawanti Hapsari, Tokyo (JP); Hideaki Takahashi, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/397,531

(22) PCT Filed: May 13, 2013

(86) PCT No.: PCT/JP2013/063239
§ 371 (c)(1),
(2) Date: Oct. 28, 2014

(87) PCT Pub. No.: WO2013/172280
PCT Pub. Date: Nov. 21, 2013

(65) Prior Publication Data
US 2015/0126152 A1 May 7, 2015

(30) Foreign Application Priority Data
May 14, 2012 (JP) .................. 2012-110897

(51) Int. Cl.
H04M 1/66 (2006.01)
H04M 1/68 (2006.01)
(Continued)

(52) U.S. Cl.
CPC ......... H04W 12/08 (2013.01); H04W 76/007 (2013.01); H04W 76/048 (2013.01); H04W 4/22 (2013.01)

(58) Field of Classification Search
CPC ..... H04W 4/22; H04W 12/08; H04W 76/007; H04W 76/04; H04W 76/048
(Continued)

(56) References Cited

U.S. PATENT DOCUMENTS

2010/0279637 A1* 11/2010 Umatt .................. H04W 48/16
455/161.2
2011/0171915 A1* 7/2011 Gomes ................. H04W 24/10
455/73
(Continued)

FOREIGN PATENT DOCUMENTS

EP 2849495 A1 3/2015
JP 2011-151843 A 8/2011
(Continued)

OTHER PUBLICATIONS

International Search Report for corresponding International Application No. PCT/JP2013/063239, dated Jul. 30, 2013 (1 page).
(Continued)

Primary Examiner — Rafael Pérez-Gutiérrez
Assistant Examiner — Mark G. Pannell
(74) Attorney, Agent, or Firm — Osha Liang LLP

(57) ABSTRACT

To improve probability of successfully performing origination processing by a priority terminal and origination processing of an emergency call even during congestion. In a mobile station UE according to the present invention, an AS function unit 11 is configured to receive SSAC information from a radio base station eNB and transmit the SSAC information to the NAS function unit 12 at a predetermined timing, and a NAS function unit 12 is configured to perform SSAC on transmission of "RA Preamble" in a RA procedure for the mobile station UE in the DRX state to transmit an uplink signal, or on transmission of an uplink signal from the mobile station UE in the Non-DRX state.

5 Claims, 2 Drawing Sheets

(51) Int. Cl.
*H04M 3/16* (2006.01)
*H04B 1/38* (2015.01)
*H04M 11/04* (2006.01)
*H04W 4/00* (2009.01)
*H04W 12/08* (2009.01)
*H04W 76/00* (2009.01)
*H04W 76/04* (2009.01)
*H04W 4/22* (2009.01)

(58) Field of Classification Search
USPC .......................................................... 455/411
See application file for complete search history.

(56) References Cited

U.S. PATENT DOCUMENTS

| | | | | |
|---|---|---|---|---|
| 2011/0199898 | A1* | 8/2011 | Cho | H04W 48/06 370/230 |
| 2011/0274051 | A1* | 11/2011 | Vikberg | H04L 63/101 370/328 |
| 2012/0129497 | A1* | 5/2012 | De Benedittis | H04W 48/02 455/411 |
| 2012/0142388 | A1* | 6/2012 | Kumar | H04W 76/041 455/509 |
| 2012/0244853 | A1* | 9/2012 | Iwamura | H04W 48/02 455/422.1 |
| 2013/0029703 | A1* | 1/2013 | Al | H04L 63/101 455/500 |
| 2013/0121225 | A1* | 5/2013 | Ryu | H04W 52/0229 370/311 |
| 2013/0170343 | A1* | 7/2013 | Ye | H04W 48/06 370/230 |
| 2014/0099912 | A1* | 4/2014 | Lee | H04W 48/08 455/404.1 |

FOREIGN PATENT DOCUMENTS

| WO | WO 2011/043322 A1 * | 4/2011 | ............ H04W 48/02 |
|---|---|---|---|
| WO | 2011/125849 A1 | 10/2011 | |

OTHER PUBLICATIONS

Written Opinion for corresponding International Application No. PCT/JP2013/063239, dated Jul. 30, 2013 (3 pages).
3GPP TS 36.300 V11.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Mar. 2012 (194 pages).
3GPP TS 36.211 V10.4.0; "3rd Generation Partnership Project; Technical Specification Group Radio Access Network; Evolved Universal Terrestrial Radio Access (E-UTRA); Physical Channels and Modulation (Release 10);" Dec. 2011 (101 pages).
3GPP TS 36.213 V10.5.0; "3rd Generation Partnership Project; Technical Specification Group Radio Access Network; Evolved Universal Terrestrial Radio Access (E-UTRA); Physical layer procedures (Release 10);" Mar. 2012 (125 pages).
3GPP TS 36.321 V10.5.0; "3rd Generation Partnership Project; Technical Specification Group Radio Access Network; Evolved Universal Terrestrial Radio Access (E-UTRA); Medium Access Control (MAC) protocol specification (Release 10);" Mar. 2012 (54 pages).
3GPP TS 36.331 V10.5.0; "3rd Generation Partnership Project; Technical Specification Group Radio Access Network; Evolved Universal Terrestrial Radio Access (E-UTRA); Radio Resource Control (RRC); Protocol specification (Release 10);" Mar. 2012 (302 pages).
Extended European Search Report issued in corresponding European Application No. 13791141.8 dated Mar. 11, 2016 (7 pages).
Martin Sauter: "From GSM to LTE—an introduction to mobile networks and mobile broadband", From GSM to LTE, Jan. 1, 2011 (Jan. 1, 2011), pp. 1-409, XP055215679, ISBN: 978-0-47-066711-8 (452 pages).
Office Action issued in the counterpart European Patent Application No. 13791141.8, dated May 26, 2017 (5 pages).
Office Action issued in the counterpart Chinese Patent Application No. 201380024835.4, dated Jul. 3, 2017 (12 pages).

* cited by examiner

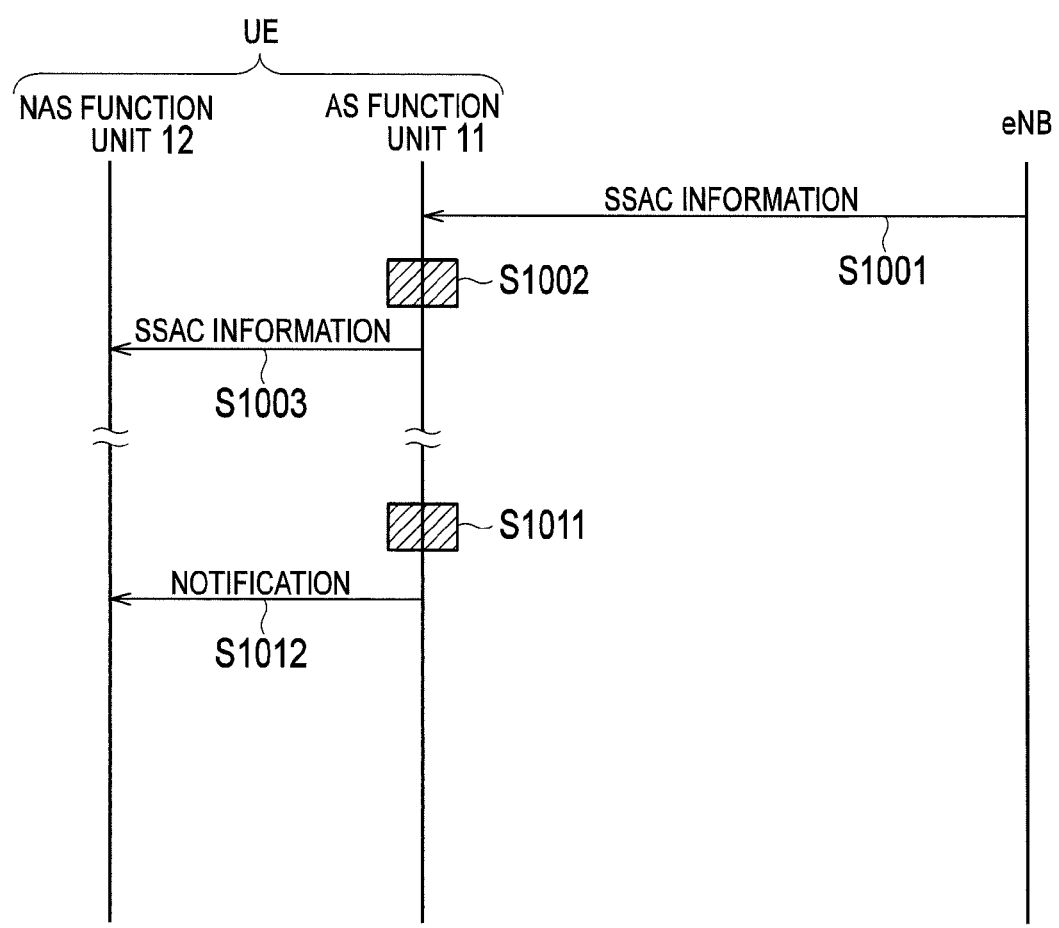

US 9,867,049 B2

MOBILE STATION PERFORMING ACCESS CONTROL WITH NAS RESTRICTION INFORMATION SENT FROM RADIO BASE STATION

TECHNICAL FIELD

The present invention relates to a mobile station.

BACKGROUND ART

In a mobile communication system of the LTE (Long Term Evolution), transmission of "RA Preamble" in a RA (Random Access) procedure for transmitting a signal relating to call origination processing (herein after referred to as origination processing) (including location registration processing, this also applies hereinafter) such as, for example, location registration processing signaling (MO-signalling) and U-plane origination processing signaling (MO-data) can be restricted by a mobile station UE in the RRC_IDLE state (idle state) using a mechanism of ACB (Access Class Barring).

PRIOR ART DOCUMENTS

Non-Patent Documents

Non-patent Document 1: 3GPP TS36.300
Non-patent Document 2: 3GPP TS36.211
Non-patent Document 3: 3GPP TS36.213
Non-patent Document 4: 3GPP TS36.321
Non-patent Document 5: 3GPP TS36.331

SUMMARY OF THE INVENTION

However, in a mobile communication system of the conventional LTE, ACB cannot be performed on a transmission of "RA Preamble" in a RA procedure performed by a mobile station UE in a RRC_CONNECTED state (connected state) as well as a DRX (Discontinuous Reception) state (intermittent reception state) in response to "UL data arrival". In other words, the transmission of the "RA Preamble" cannot be restricted.

Accordingly, there are problems that "RA preamble" transmitted in a RA procedure for performing origination processing by a priority terminal or origination processing of an emergency call during congestion is prevented by the above-mentioned "RA Preamble" and thereby causes failure of the RA procedure, and depletion of network resources and congestion of processing due to returning to the DRX state may cause a delay or failure of the origination processing.

Thus, the present invention has been made in view of such circumstances and has an objective of providing a mobile station capable of improving the probability of successfully performing origination processing by a priority terminal and origination processing of an emergency call even during congestion.

A first feature of the present invention is summarized as a mobile station including: an AS (Access Stratum) function unit; and a NAS (Non Access Stratum) function unit. Here, the AS function unit is configured to receive NAS restriction information from a radio base station, and transmit the NAS restriction information to the NAS function unit at a predetermined timing, and the NAS function unit is configured to perform access control processing on transmission of a random access preamble in a random access procedure for the mobile station in an intermittent reception state to transmit an uplink signal, or on transmission of an uplink signal from the mobile station in a continuous reception state, using the NAS restriction information.

BRIEF DESCRIPTION OF THE DRAWINGS

FIG. 3 is a sequence diagram for illustrating the operation of the mobile station according to the first embodiment of the present invention.

MODES FOR CARRYING OUT THE INVENTION (Mobile Communication System According to the First Embodiment of the Present Invention)

The mobile communication system according to the first embodiment of the present invention is described with reference to FIGS. 1 to 3.

Figure 1:
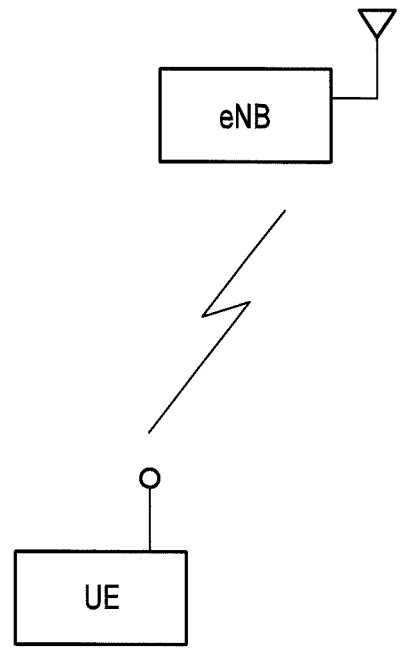
FIG. 1 is an overall configuration diagram of a mobile communication system according to a first embodiment of the present invention.

The mobile communication system according to this embodiment supports the LTE scheme, and includes a radio base station eNB and a mobile station UE, as shown in FIG. 1.

Figure 2:
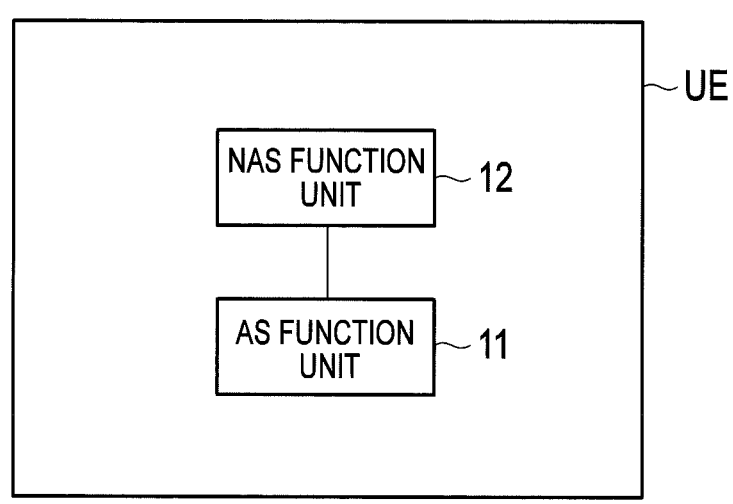
FIG. 2 is a functional block diagram of a mobile station according to the first embodiment of the present invention.

As shown in FIG. 2, the mobile station UE according to this embodiment includes an AS function unit 11 and a NAS function unit 12.

The AS function unit 11 is configured to perform processing in a NAS layer, and the NAS function unit 12 is configured to perform processing in the AS layer. Note that the NAS function unit 12 may include an IMS application processing layer.

For example, the AS function unit 11 is configured to receive and store SSAC (Service Specific Access Control) information from the radio base station eNB.

Here, the SSAC information is restriction information (NAS restriction information) used in SSAC performed by the NAS function unit 12.

When the mobile station UE is in the RRC_CONNECTED state, the AS function unit 11 may be configured to receive SSAC information via broadcast information, for example, SIB2 (System Information Block 2).

In addition, the AS function unit 11 may be configured to receive updated SSAC information upon reception of "System Info Modification".

Further, the AS function unit 11 is configured to transmit up-to-date SSAC information stored therein to the NAS function unit 12 at a predetermined timing.

Here, when the mobile station UE transitions from a Non-DRX (Non-Discontinuous Reception) state (a continuous reception state) to a DRX state, the AS function unit 11 may be configured to transmit SSAC information stored therein to the NAS function unit 12.

Alternatively, when it is detected that SSAC information has been updated, the AS function unit 11 may be configured to transmit the updated SSAC information to the NAS function unit 12.

When the mobile station UE transitions from the DRX state to the Non-DRX state, the AS function unit 11 may be configured to transmit information indicating that SSAC information already transmitted is invalid to the NAS function unit 12.

In addition, when the mobile station UE transitions to the Non-DRX state, the AS function unit 11 may be configured to transmit SSAC information to the NAS function unit 12.

Here, the AS function unit 11 is configured to perform ACB (access control processing) on transmission of a signal regarding origination processing, using ACB information (AS restriction information).

The AS function unit 11 is configured not to perform ACB on transmission of "RA Preamble" in a RA procedure for the mobile station UE in the RRC_CONNECTED state and in the DRX state to transmit an uplink signal.

The NAS function unit 12 is configured to receive and store SSAC information from the AS function unit 11.

When instructed by an upper layer to perform origination processing, the NAS function unit 12 is configured to perform SSAC (access control processing) on transmission of a signal regarding the origination processing, using up-to-date SSAC information stored therein.

For example, the NAS function unit 12 is configured to perform SSAC (access control processing) on transmission of "RA Preamble" in a RA procedure for the mobile station UE in the DRX state to transmit an uplink signal, using up-to-date SSAC information stored therein.

That is, the NAS function unit 12 can restrict transmission of the "RA Preamble", using a mechanism of SSAC.

When permitting transmission of the "RA Preamble", the NAS function unit 12 is configured to transmit call originating instruction indicating the permission to the AS function unit 11, and the AS function unit 11 is configured to transmit the "RA Preamble" according to the call originating instruction.

When received information indicating that the already transmitted SSAC information is invalid, from the AS function unit 11, the NAS function unit 12 cannot perform SSAC on transmission of a signal regarding origination processing, using the SSAC information stored therein.

The NAS function unit 12 may be configured to perform SSAC on transmission of an uplink signal, for example, a SIP (Session Initiation Protocol) signal, from the mobile station UE in the Non-DRX state.

Hereinafter, the operation of the mobile station UE according to this embodiment is described with reference to FIG. 3.

As shown in FIG. 3, at Step S1001, the AS function unit 11 receives SSAC information from the radio base station eNB via SIB2 and stores therein.

Here, the AS function unit 11 acquires up-to-date SSAC information every time the SSAC information is updated.

When it is detected at Step S1002 that the mobile station UE transitions from the Non-DRX state to the DRX state, the AS function unit 11 transmits the up-to-date SSAC information stored therein to the NAS function unit 12 at Step S1003.

The AS function unit 11 may transmit up-to-date SSAC information to the NAS function unit 12 every time the SSAC information is updated.

When instructed by an upper layer to perform origination processing, the NAS function unit 12 performs SSAC on transmission of a signal regarding the origination processing, using the up-to-date SSAC information stored therein.

Thereafter, when it is detected at Step S1011 that the mobile station UE transitions from the DRX state to the Non-DRX state, the AS function unit 11 transmits information indicating that the already transmitted SSAC information is invalid at Step S1012.

Consequently, even when instructed by an upper layer to perform origination processing, the NAS function unit 12 does not perform SSAC on transmission of a signal regarding the origination processing, using the up-to-date SSAC information stored therein.

According to an aspect of this embodiment, when it is detected that the mobile station UE transitions from the Non-DRX state to the DRX state, the AS function unit 11 is configured to transmit the up-to-date SSAC information stored therein to the NAS function unit 12, and the NAS function unit 12 is configured to perform SSAC on transmission of "RA Preamble" in a RA procedure for origination processing performed by the mobile station UE in the RRC_CONNECTED state and in the DRX state, using the SSAC information. Accordingly, even when origination processing by a mobile station UE in the RRC_CONNECTED and in the DRX state occurs frequently, the probability of successfully performing origination processing by a priority terminal and origination processing of an emergency call.

The features of the present invention may also be expressed as follows.

A first feature of this embodiment is summarized as a mobile station UE including: an AS function unit 11; and a NAS function unit 12. Here, the AS function unit 11 is configured to receive SSAC information (NAS restriction information) from a radio base station eNB, and transmit the SSAC information to the NAS function unit 12 at a predetermined timing, and the NAS function unit 12 is configured to perform access control processing on transmission of "RA Preamble (a random access preamble)" in a RA procedure (random access procedure) for the mobile station UE in a DRX state (an intermittent reception state) to transmit an uplink signal, or on transmission of an uplink signal (for example, a SIP signal) from the mobile station UE in a Non-DRX state (a continuous reception state), using the NAS restriction information.

In the first feature of this embodiment, when the mobile station UE transitions from the Non-DRX state to the DRX state, the AS function unit 11 may be configured to transmit the SSAC information to the NAS function unit 12.

In the first feature of this embodiment, when the mobile station UE transitions from the DRX state to the Non-DRX state, the AS function unit 11 may be configured to transmit information indicating that the SSAC information is invalid to the NAS function unit 12.

In the first feature of this embodiment, when it is detected that the SSAC information is updated, the AS function unit 11 may be configured to transmit the updated SSAC information to the NAS function unit 12.

In the first feature of this embodiment, when the mobile station UE transitions to the Non-DRX state, the AS function unit 11 may be configured to transmit the SSAC information to the NAS function unit 12.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-110897 (filed on May 14, 2012) is incorporated by reference in the present specification.

INDUSTRIAL APPLICABILITY

As described above, an aspect of the present invention provides a mobile station capable of improving the probability of successfully performing origination processing by a priority terminal and origination processing of an emergency call even during congestion.

EXPLANATION OF THE REFERENCE NUMERALS

UE mobile station
eNB radio base station
11 AS function unit
12 NAS function unit

The invention claimed is:

1. A mobile station comprising a processor and a memory, the memory embodying instructions that cause the processor to function as:
   an AS (Access Stratum) function unit; and
   a NAS (Non Access Stratum) function unit, wherein
   the AS function unit is configured to receive NAS restriction information from a radio base station, and transmit the NAS restriction information to the NAS function unit, and
   the NAS function unit is configured to perform access control processing on transmission of a random access preamble in a random access procedure for the mobile station in a RRC_CONNECTED state and in a Discontinuous Reception (DRX) state to transmit an uplink signal, using the NAS restriction information.

2. The mobile station according to claim 1, wherein when the mobile station transitions from a continuous reception state to the DRX state, the AS function unit is configured to transmit the NAS restriction information to the NAS function unit.

3. The mobile station according to claim 1, wherein when the mobile station transitions from the DRX state to a continuous reception state, the AS function unit is configured to transmit information indicating that the NAS restriction information is invalid to the NAS function unit.

4. The mobile station according to claim 1, wherein when it is detected that the NAS restriction information is updated, the AS function unit is configured to transmit the updated NAS restriction information to the NAS function unit.

5. The mobile station according to claim 1, wherein when the mobile station transitions to a continuous reception state, the AS function unit is configured to transmit the NAS restriction information to the NAS function unit.

* * * * *